«12» United States Patent
Usui

«10» Patent No.: US 10,365,846 B2
«45» Date of Patent: Jul. 30, 2019

«54» STORAGE CONTROLLER, SYSTEM AND METHOD USING MANAGEMENT INFORMATION INDICATING DATA WRITING TO LOGICAL BLOCKS FOR DEDUPLICATION AND SHORTENED LOGICAL VOLUME DELETION PROCESSING

«71» Applicant: FUJITSU LIMITED, Kawasaki-shi, Kanagawa (JP)

«72» Inventor: Kazuhiko Usui, Kawasaki (JP)

«73» Assignee: FUJITSU LIMITED, Kawasaki (JP)

«*» Notice: Subject to any disclaimer, the term of this patent is extended or adjusted under 35 U.S.C. 154(b) by 0 days.

«21» Appl. No.: 15/586,592

«22» Filed: May 4, 2017

«65» Prior Publication Data

US 2017/0351457 A1 Dec. 7, 2017

«30» Foreign Application Priority Data

Jun. 3, 2016 (JP) .................................. 2016-111767

«51» Int. Cl.
*G06F 3/06* (2006.01)
«52» U.S. Cl.
CPC ............ *G06F 3/0641* (2013.01); *G06F 3/061* (2013.01); *G06F 3/0608* (2013.01); *G06F 3/0673* (2013.01)
«58» Field of Classification Search
CPC ....... G06F 3/0641; G06F 3/061; G06F 3/0673
See application file for complete search history.

«56» References Cited

U.S. PATENT DOCUMENTS

| 2003/0018864 | A1* | 1/2003 | Ikeuchi | ................. G06F 3/0601 711/161 |
| 2008/0281879 | A1* | 11/2008 | Kawamura | ......... G06F 11/1471 |
| 2009/0254722 | A1* | 10/2009 | Kobashi | .............. G06F 11/2082 711/162 |
| 2010/0199065 | A1 | 8/2010 | Kaneda | |

(Continued)

FOREIGN PATENT DOCUMENTS

| JP | 2010-182302 | 8/2010 |
| WO | WO 2011/121905 A1 | 10/2011 |

*Primary Examiner* — Glenn Gossage
«74» *Attorney, Agent, or Firm* — Staas & Halsey LLP

«57» ABSTRACT

A storage controller includes a processor and a memory to store first management information indicating data writing to each of a plurality of logical blocks, corresponding to a plurality of physical blocks of a storage device. The processor is configured to receive a write request to write data to a first logical block and assign a first physical block to the first logical block. The processor is also configured to record in the first management information that data has been written in the first logical block, identify a second logical block in which data has been written, write the addresses of the plurality of physical blocks as second management information, read an address of a second physical block assigned to the second logical block from the second management information, and release the second physical block. The memory may store third management information indicating the number of assignments to each logical block in a plurality of logical volumes corresponding to a storage area, and assign a physical block to a logical block so as to remove duplicate data, or de-duplicate data, in the storage area. A bit map may be stored as the first management information.

6 Claims, 14 Drawing Sheets

(56) References Cited

U.S. PATENT DOCUMENTS

| | | | |
|---|---|---|---|
| 2011/0016152 A1* | 1/2011 | Popovski | G06F 3/0608 707/797 |
| 2011/0231594 A1* | 9/2011 | Sugimoto | G06F 3/0616 711/103 |
| 2012/0158674 A1* | 6/2012 | Lillibridge | G06F 17/30091 707/692 |
| 2013/0013570 A1 | 1/2013 | Yamakawa | |
| 2014/0052947 A1* | 2/2014 | Usui | G06F 3/065 711/162 |

* cited by examiner

FIG. 4

| ADDRESS CORRESPONDING TABLE || ||
|---|---|---|---|
| LOGICAL ADDRESS || PHYSICAL ADDRESS ||
| LUN | LBA | POOL ID | LBA |
| LUN1 | LBA1 | PV1 | PA1 |
| LUN1 | LBA2 | PV1 | PA2 |
| LUN1 | LBA3 | — | — |
| ... | ... | ... | ... |

| HASH VALUE MANGEMENT TABLE | | | |
| --- | --- | --- | --- |
| HASH VALUE | PHYSICAL ADDRESS | | REFERENCE COUNT |
| | POOL ID | LBA | |
| HS1 | PV1 | PA1 | 1 |
| HS2 | PV1 | PA2 | 1 |

211a
211b
211c

STORAGE CONTROLLER, SYSTEM AND METHOD USING MANAGEMENT INFORMATION INDICATING DATA WRITING TO LOGICAL BLOCKS FOR DEDUPLICATION AND SHORTENED LOGICAL VOLUME DELETION PROCESSING

CROSS-REFERENCE TO RELATED APPLICATION

This application is based upon and claims the benefit of priority of prior Japanese Patent Application No. 2016-111767, filed on Jun. 3, 2016, the entire contents of which are incorporated herein by reference.

FIELD

The embodiments discussed herein are related to a storage controller, a storage system, and a storage control method.

BACKGROUND

A technique called "de-duplication", which removes duplicate data at the time of storing data in a storage device in order to improve the use efficiency of a storage area, is known. For example, in this technique, when a write request of data is issued, a comparison is made of the hash value calculated based on the data and the hash value based on data that is already stored in a storage controller. If the hash values are the same, the storage controller determines that the data is duplicate data, and does not store the write-requested data in the storage device.

Related-art techniques are disclosed in Japanese Laid-open Patent Publication No. 2010-182302, and International Patent Publication No. WO 2011/121905.

SUMMARY

According to an aspect of the invention, a storage controller includes a memory configured to store first management information indicating data writing to each of a plurality of logical blocks corresponding to a plurality of physical blocks of a storage device, and a processor coupled to the memory and configured to receive a write request of write data to a first logical block among the plurality of logical blocks, assign a first physical block among the plurality of physical blocks to the first logical block, write the write data in the first physical block, record in the first management information that data has been written in the first logical block, identify a second logical block in which data has been written among the plurality of logical blocks based on the first management information, write addresses of the plurality of physical blocks assigned to the corresponding plurality of logical blocks in the storage device as second management information, read an address of the second physical block assigned to the second logical block based on the second management information, and release the second physical block of the read address.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of address corresponding tables;
FIG. 5 is a diagram illustrating an example of hash value management tables.

DESCRIPTION OF EMBODIMENTS

The de-duplication technique described above is one kind of virtual memory technique for assigning physical storage areas to only logical blocks in which data has been written among the logical blocks of a logical storage area. In such a virtual memory technique, management information is used that indicates a corresponding relationship between each logical block of a logical volume and a physical block assigned from a physical storage area. Also, this management information has a large amount of data, and thus the management information is sometimes stored not in a storage controller, but in a storage device that provides the physical storage area.

Here, when a logical volume as described above is deleted, "release" processing for returning the physical block that is assigned to each logical block of a logical volume to a reusable unassigned area is performed. In order to perform the release processing, the storage controller searches all the records of the above-described management information, determines whether or not a physical block is assigned to each logical block, and obtains the assigned physical block. However, if the management information is stored in the storage device, the number of access times to the storage device increases in order to search all the records in the management information. As a result, there is a problem in that deletion processing of a logical volume takes a long time.

According to an aspect of the present disclosure, it is desirable to provide a storage controller, a storage system, and a storage control method that are capable of shortening processing time for deleting a logical volume.

In the following, descriptions will be given of embodiments with reference to the drawings.

First Embodiment

Figure 1:
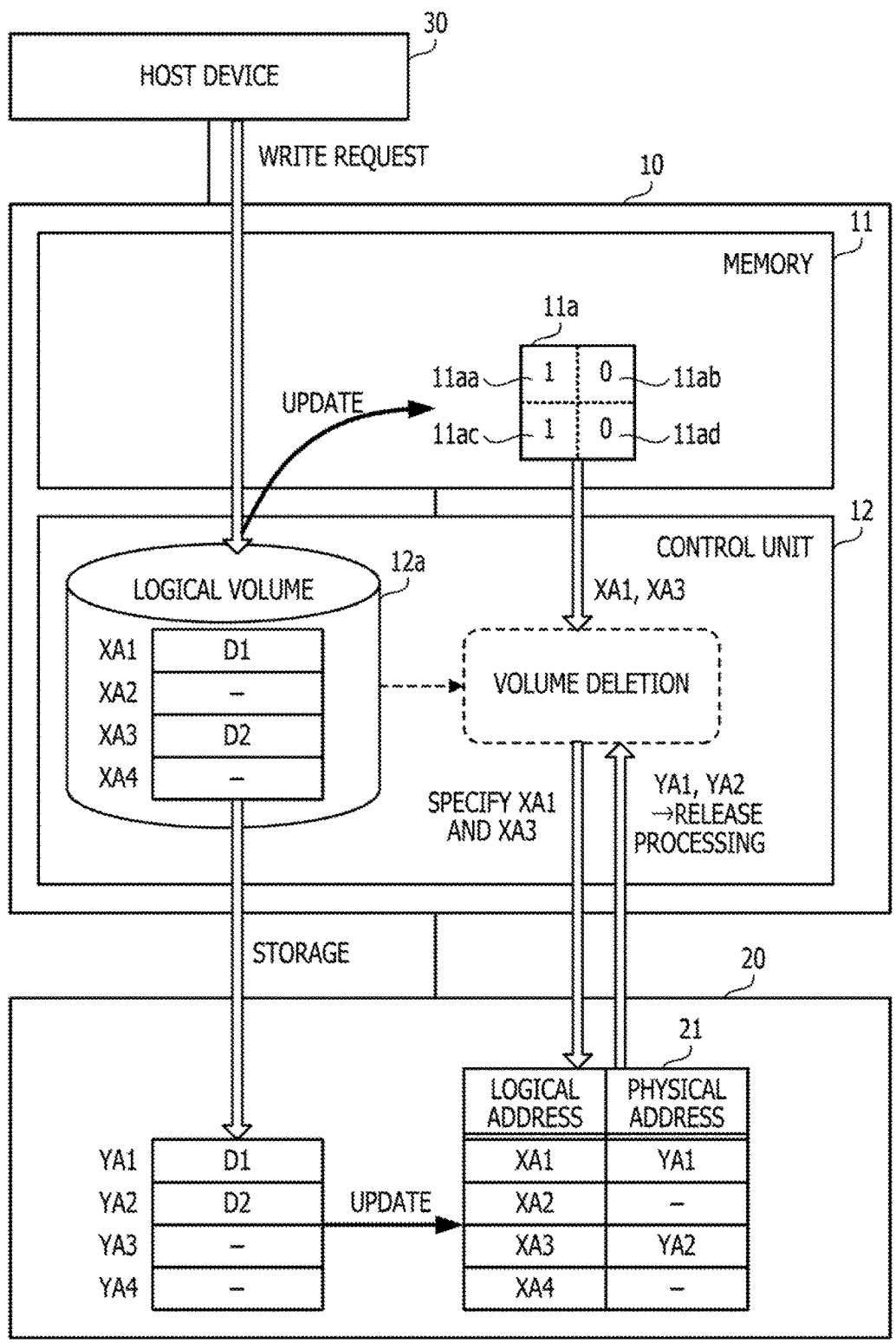
FIG. 1 is a diagram illustrating a storage system including a storage controller according to a first embodiment.

FIG. 1 is a diagram illustrating a storage system including a storage controller according to a first embodiment. A storage device 20 and a host device 30 are coupled to a storage controller 10 illustrated in FIG. 1. The storage controller 10 and the storage device 20 are realized, for example, as a storage device mounted in one case. Also, it may be thought that the storage controller 10 and the storage device 20 constitute a storage system.

The storage controller 10 controls access to the storage device 20 in response to a request from the host device 30. For example, the storage controller 10 creates a logical volume 12a that is realized by the storage area of the storage device 20. The storage controller 10 then controls access to the logical volume 12a in response to an access request from the host device 30.

The storage device 20 stores management information 21 in which the address of an assigned physical block is stored from a plurality of physical blocks produced by dividing the storage area of the storage device 20 for each of a plurality of logical blocks produced by dividing the logical volume 12a. The management information 21 stores records corresponding to all the logical blocks of the logical volume 12a. However, as described later, in the logical volume 12a, physical blocks are assigned to only logical blocks in which data has been written. Accordingly, the address of a physical block does not have to be stored in all the records of the management information 21.

Also, as described above, the management information 21 includes the records corresponding to all the logical blocks of the logical volume 12a, and thus has a large amount of data. Accordingly, the management information 21 is stored not in the storage controller 10, but in the storage device 20 that provides a physical storage area of the logical volume 12a.

In this regard, it is assumed that, in FIG. 1, the logical volume 12a includes four logical blocks that are individually identified by logical addresses XA1 to XA4 in order to simplify the description.

The storage controller 10 includes a memory 11 and a control unit 12. The memory 11 is a volatile storage device, such as a random access memory (RAM), or the like. The control unit 12 is, for example, a processor. The processor may include a central processing unit (CPU), a digital signal processor (DSP), an application specific integrated circuit (ASIC), a field programmable gate array (FPGA), or the like. Also, the control unit 12 may be a multiprocessor.

The memory 11 stores management information indicating whether or not data is written for each logical block of the logical volume 12a. In the example in FIG. 1, as such management information, a bit map 11a that includes a bit corresponding to each logical block of the logical volume 12a is stored. In the bit map 11a, if a bit value is 0, it indicates that data is not written in the corresponding logical block. Also, if a bit value is 1, it indicates that data is written in the corresponding logical block. In this regard, in FIG. 1, areas 11aa, 11ab, 11ac, and 11ad in the bit map 11a correspond to the respective logical blocks that are identified by logical addresses XA1, XA2, XA3, and XA4.

When a write request of write data in a specified logical block in the logical volume 12a is issued from the host device 30, the control unit 12 selects one unassigned physical block from a plurality of physical blocks of the storage device 20. The control unit 12 assigns the selected physical block to the specified logical block and stores the write data in the selected physical block. In this manner, the control unit 12 assigns a physical block to only a logical block in which data is written among the logical blocks of the logical volume 12a.

In FIG. 1, for example, if a write request of data D1 in the logical block of the logical address XA1 is issued, the control unit 12 assigns a physical block of a physical address of YA1 to the logical block of the logical address XA1. The data D1 is then written in the physical block of the physical address YA1. Also, if a write request of data D2 in a logical block of a logical address XA3 is issued, the control unit 12 assigns a physical block of a physical address YA2 to the logical block of the logical address XA3. The data D2 is then written in the physical block of the physical address YA2.

Also, the control unit 12 performs the assigning processing of a physical block as described above, and records that data has been written in the specified logical block in the bit map 11a. In FIG. 1, for example, the control unit 12 updates the bit of the area 11aa corresponding to the logical address XA1 to 1 among the bits of the bit map 11a in response to the write request of the data D1. Also, the control unit 12 updates the bit of the area 11ac corresponding to the logical address XA3 to 1 among the bits of the bit map 11a in response to the write request of the data D2.

Also, the control unit 12 performs the processing as follows at the time of deleting the logical volume 12a. The control unit 12 identifies a logical block in which data is written among the logical blocks of the logical volume 12a based on the bit map 11a. In the example in FIG. 1, the logical blocks corresponding to the respective logical addresses XA1 and XA3 are identified. Next, the control unit 12 reads the addresses of the physical blocks assigned to the identified logical blocks from the management information 21. In the example in FIG. 1, the physical addresses YA1 and YA3 are read.

The control unit 12 performs release processing for releasing the physical addresses YA1 and YA3. The "release" refers to returning a physical address to a reusable unallocated area. In the release processing, for example, the physical addresses YA1 and YA3 are added to the management information by which unassigned physical addresses in the storage device 20 are managed. Also, for example, when data is stored in the storage device 20 so that duplicate data is removed, the release processing may determine whether or not it is possible to release the physical block corresponding to the physical addresses YA1 and YA3. For example, if another logical block is assigned to the physical block, it is not possible to release the physical block.

In the above deletion processing of the logical volume 12a, the control unit 12 refers to the bit map 11a stored in the memory 11 before referring to the management information 21 stored in the storage device 20, and identifies a logical block in which data is written. Accordingly, it is possible for the control unit 12 to read the address of the recorded physical block from the records corresponding to the identified logical block without searching all the records of the management information 21. Thereby, it is possible to reduce the number of times the storage device 20 is accessed and the access time in the deletion processing. As a result, it is possible to shorten the time taken for the deletion processing.

Second Embodiment

Next, a description will be given of an example of a storage system using a de-duplication technique as a second embodiment.

Figure 2:
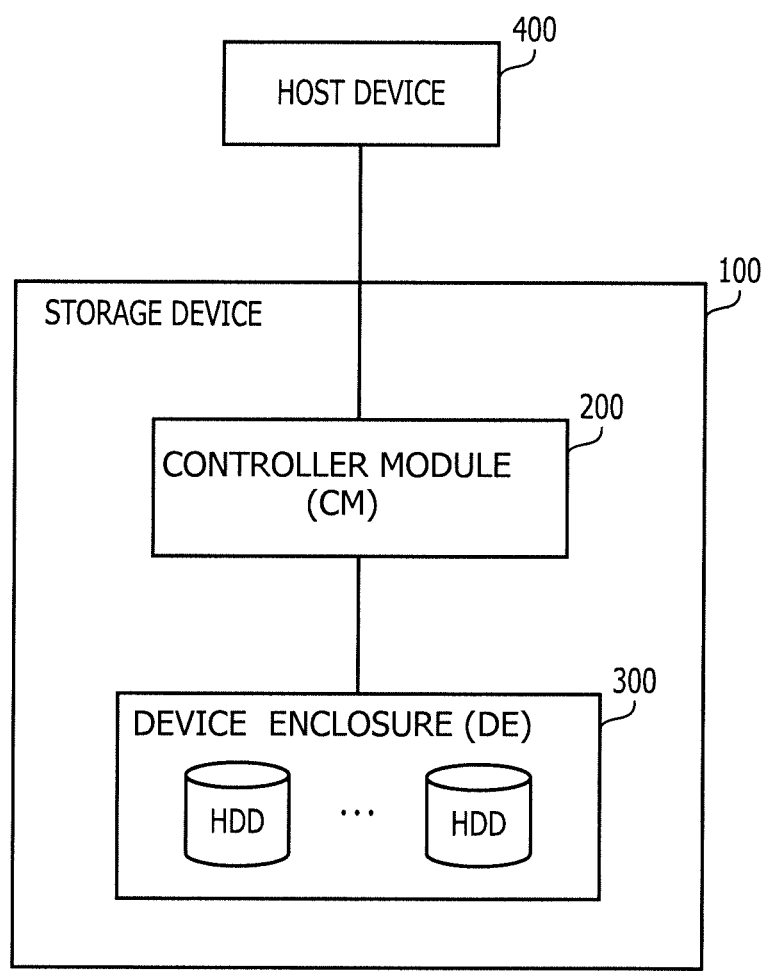
FIG. 2 is a diagram illustrating a storage system according to a second embodiment.

FIG. 2 is a diagram illustrating a storage system according to the second embodiment. The storage system illustrated in FIG. 2 includes a storage device 100 and a host device 400. The storage device 100 and the host device 400 are coupled via a Storage Area Network (SAN) using, for example, a fibre channel (FC), Internet Small Computer System Interface (iSCSI), or the like.

The storage device 100 includes a controller module (CM) 200 and a device enclosure (DE) 300. The CM 200 controls the entire storage device 100.

The DE 300 includes a plurality of storage devices mounted thereon. The DE 300 is a disk array device including hard disk drives (HDDs) as storage devices. In this regard, the storage devices that are mounted on the DE 300 may be another kind of storage devices, such as a solid state drive (SSD), or the like.

In the storage device 100, the CM 200 controls access to the storage devices mounted on the DE 300 in response to a request from the host device 400. In particular, the CM 200 creates one or more logical volumes that are realized by the storage area of the storage devices in the DE 300. A logical unit number (LUN) is assigned to each logical volume. Also, each logical volume is divided into logical blocks having a fixed size, and each logical block is given a logical block address (LBA). The CM 200 then receives an access request specifying the LUN of the logical volume and the LBA of the logical block from the host device 400. The CM 200 accesses the data stored in the logical block in response to the access request.

Also, the CM 200 performs control such that duplicate data is removed when data of the logical volume is stored in the storage area of the storage devices in the DE 300. Specifically, the CM 200 sets one or more pool volumes using the storage area of the storage devices in the DE 300. Each of the pool volumes may be realized as a simple set of the storage areas of one or more storage devices in the DE 300 or a logical storage area realized by a plurality of storage devices that are controlled by a redundant array of inexpensive disks (RAID). It is possible for the CM 200 to set one or more logical volumes to one pool volume. The CM 200 then stores the data in all the logical volumes that are set in the one pool volume in the pool volume so as to remove duplicate data.

In this regard, each of the pool volumes is divided into blocks having the same size as the logical blocks of the logical volume, and each block is given an LBA. In the following description, an LBA of a logical block in a logical volume is referred to as a "logical address", and an LBA of a block in a pool volume is referred to as a "physical address".

Next, a description will be given of hardware of the CM 200.

Figure 3:
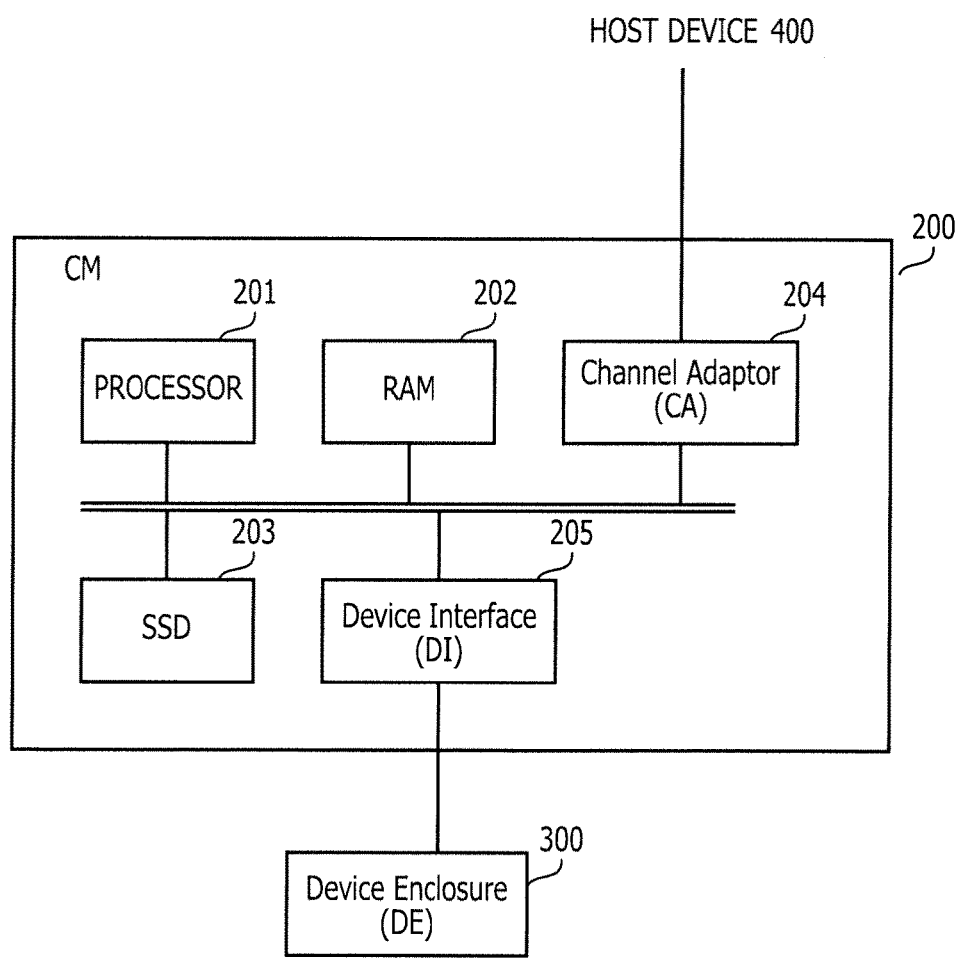
FIG. 3 is a diagram illustrating an example of hardware of a controller module (CM)

FIG. 3 is a diagram illustrating an example of hardware of a CM. The CM 200 includes a processor 201, a RAM 202, an SSD 203, a channel adapter (CA) 204 and a device interface (DI) 205.

The processor 201 controls information processing of the CM 200. The processor 201 may be a multiprocessor including a plurality of processing elements.

The RAM 202 is the main memory of the CM 200. The RAM 202 temporarily stores the program of the operating system (OS) and at least a part of the application programs executed by the processor 201. Also, the RAM 202 stores various kinds of data to be used for processing by the processor 201.

The SSD 203 is an auxiliary memory of the CM 200. The SSD 203 is a nonvolatile semiconductor memory. The SSD 203 stores the OS program, the application programs, and the various kinds of data. In this regard, the CM 200 may include an HDD in place of the SSD 203 as the auxiliary memory.

The channel adapter (CA) 204 is an interface for communicating with the host device 400. The device interface (DI) 205 is an interface for communicating with the device enclosure (DE) 300.

FIG. 4 is a diagram illustrating an example of address corresponding tables. The address corresponding tables are stored in the storage device in the DE 300. An address corresponding table is created for each logical volume. For example, the address corresponding tables 301a, 301b, and 301c in FIG. 4 correspond to the respective logical volumes. In the following, the address corresponding tables are sometimes referred to as an address corresponding table 301 in general.

The address corresponding table 301 includes items Logical Address and Physical Address. The item Logical Address includes information indicating the LUN and the LBA of a logical volume. The item LUN stores information indicating an LUN. The item LBA stores the LBA of a logical volume.

The item of a Physical Address stores identification information block that is assigned from the pool volume to the logical address. Specifically, the item physical address stores information indicating a pool identifier (ID) of a pool volume and an LBA. The item Pool ID stores identification information of a pool volume. The item LBA stores the LBA of a pool volume.

The address corresponding tables 301a to 301c include records corresponding to all the logical blocks in the respective logical volumes. Accordingly, the address corresponding tables 301a to 301c have a large amount of data. Thus, the address corresponding tables 301a to 301c are not stored in the RAM 202, but stored in the storage device in the DE 300. Also, only some of the records (for example, the records corresponding to the logical blocks having a high access frequency) of the address corresponding tables 301a to 301c may be stored in the RAM 202.

FIG. 5 is a diagram illustrating an example of hash value management tables. The hash value management tables include information for removing duplication and are included in the RAM 202. A hash value management table is created for each pool volume. For example, the hash value management tables 211a, 211b, and 211c in FIG. 5 individually correspond to the respective pool volumes. In the following, the hash value management tables are sometimes referred to as a hash value management table 211 in general.

The hash value management table 211 includes items Hash Value, Physical Address, and Reference Count. The item Hash Value stores information indicating a hash value. The item Physical Address stores identification information of the pool volume block in which data corresponding to the hash value is stored. Specifically, the item Physical Address stores the Pool ID of the pool volume, and information indicating an LBA. The item Pool ID stores identification information of a pool volume. The item LBA stores the LBA of a pool volume. The item Reference Count stores the number of logical addresses that are assigned to a physical address. The value of the reference count value is increased or decreased in accordance with the assignment state of the physical address. If the value of the reference count becomes 0, the pool volume block indicated by the corresponding physical address is returned to the unallocated area and becomes reusable. That is to say, this block is released.

In this regard, in the following description, the fact that a physical address is assigned to a logical address is sometimes expressed by the expression "a logical address refers to a physical address". In the case of using this expression, the reference count indicates the number of logical addresses that refer to physical addresses.

Figure 6:
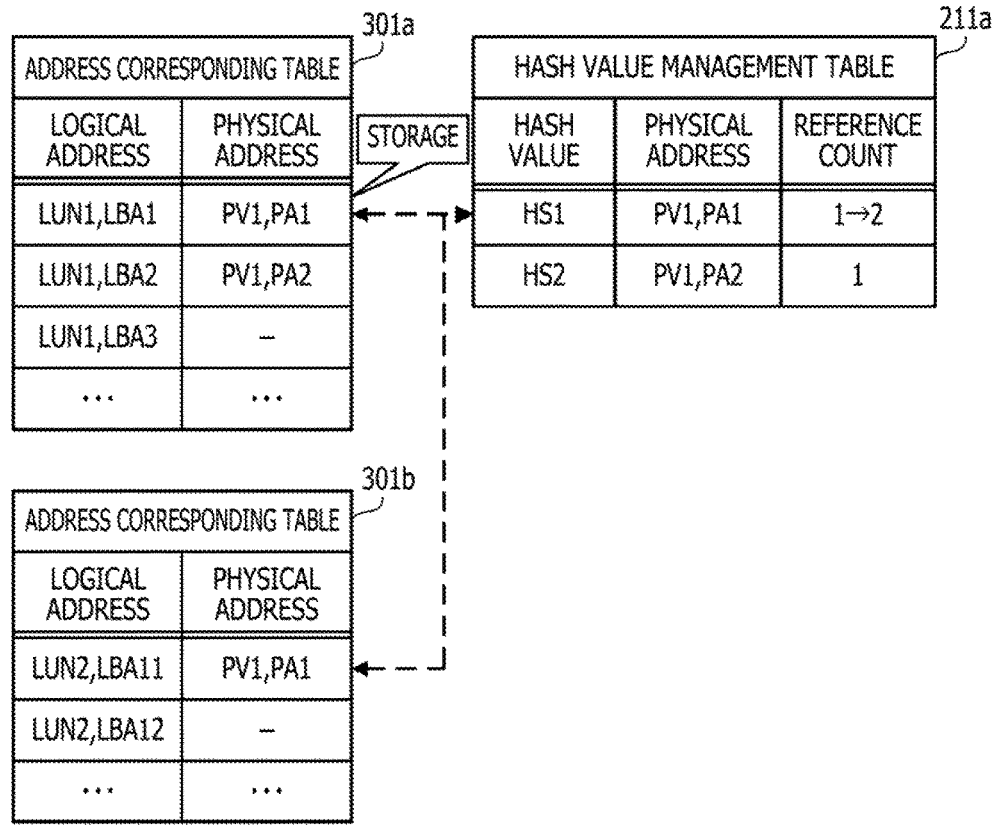
FIG. 6 is a diagram illustrating a comparative example (1 of 2)
Figure 7:
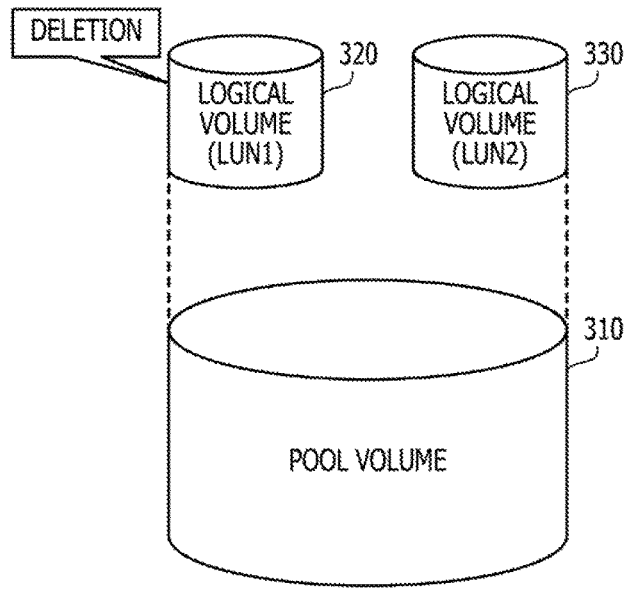
FIG. 7 is a diagram illustrating a comparative example (2 of 2)

Next, a comparative example is illustrated in FIGS. 6 and 7, and the problems of the comparative example are described. After that, a description will be given of the processing according to the second embodiment. In this regard, in the comparative example, it is assumed that each of the devices described in FIG. 2 is used.

FIG. 6 is a diagram illustrating a comparative example (1 of 2). The CM 200 creates logical volumes 320 and 330. LUN1 is assigned to the logical volume 320. LUN2 is assigned to the logical volume 330. The CM 200 creates the logical volumes 320 and 330, and then creates the address corresponding table 301a corresponding to the logical volume 320 and the address corresponding table 301b corresponding to the logical volume 330. In the initial state of the address corresponding tables 301a and 301b, information indicating that a LUN and an LBA are stored in the item Logical Address is stored, and the item Physical Address is blank (or "NULL" is stored).

Also, a pool volume 310 is set to the storage area that is assigned to the logical volumes 320 and 330.

The hash value management table 211a is stored in the RAM 202 of the CM 200. The hash value management table 211a is shared between the logical volumes 320 and 330. Also, the address corresponding tables 301a and 301b are stored in the storage device of the DE 300.

In FIG. 6, the case where the host device 400 issued a write request of the data specified by the logical address (LUN, LBA) will be described. The write request is made for each data block. For example, the amount of data of a data block is 4 kilobytes (KB), and this is the same size as that of the logical block.

The CM 200 receives the logical address (LUN1, LBA1) of a write destination and the data block from the host device 400 (FIG. 2). The CM 200 then determines whether or not the received data block is duplicated with a data block stored in the pool volume 310. The determination is made of whether or not the hash value calculated based on the received data block is stored in the hash value management table 211a. In this regard, the hash value is calculated using, for example, the hash function of Secure Hash Algorithm 1 (SHA-1).

Here, it is assumed that the received data block is determined to be duplicated. Also, it is assumed that a determination is made that the same data block as the data block received from the hash value management table 211a is stored in the physical address (PV1, PA1) of the pool volume 310. In this regard, PV1 is a pool ID, and PA1 is an LBA. In this case, the CM 200 does not store the received data block in the pool volume 310, but stores the relationship between the logical address (LUN1, LBA1) and the physical address (PV1, PA1) in the address corresponding table 301a. After the CM 200 stores the relationship, the CM 200 changes the reference count corresponding to the physical address (PV1, PA1) from 1 to 2 in the hash value management table 211a. Thereby, the fact that the two logical addresses, the logical address (LUN1, LBA1) and the logical address (LUN2, LBA11) refer to the physical address (PV1, PA1) is stored.

FIG. 7 is a diagram illustrating a comparative example (2 of 2). FIG. 7 illustrates the state where the CM 200 deletes the logical volume 320 by an instruction from the host device 400 in the state of FIG. 6.

The CM 200 receives a deletion instruction of the logical volume 320 from the host device 400 and starts the deletion processing of the logical volume 320. The CM 200 subtracts from the reference count stored in the hash value management table 211a with the deletion of the logical volume 320.

Here, in order to subtract from the reference count, the CM 200 searches all the logical addresses stored in the address corresponding table 301a for which logical address refers to which physical address.

For example, the CM 200 refers to the address corresponding table 301a, and identifies that the logical address (LUN1, LBA1) refers to the physical address (PV1, PA1). The CM 200 refers to the hash value management table 211a, and subtracts from the value of the reference count corresponding to the physical address (PV1, PA1). Next, the CM 200 refers to the address corresponding table 301a, and identifies that the logical address (LUN1, LBA2) refers to the physical address (PV1, PA2). The CM 200 refers to the hash value management table 211a, and subtracts from the value of the reference count corresponding to the physical address (PV1, PA2). Next, the CM 200 refers to the address corresponding table 301a, and determines that the logical address (LUN1, LBA3) does not refer to any physical addresses. In this manner, the CM 200 searches all the logical addresses.

However, in this manner, if all the logical addresses are searched for, the address corresponding table 301a is referenced, and thus the number of access times to the storage device in the DE 300 increases. As a result, it takes a longer time to perform the deletion processing of the logical volume.

Thus, in the second embodiment, only the records that are demanded in the address corresponding table 301a is referenced so that the number of access times to the storage device in the DE 300 is reduced. As a result, the processing time for deleting the logical volume 320 is shortened. A description will be given of the second embodiment using a specific example.

Figure 8:
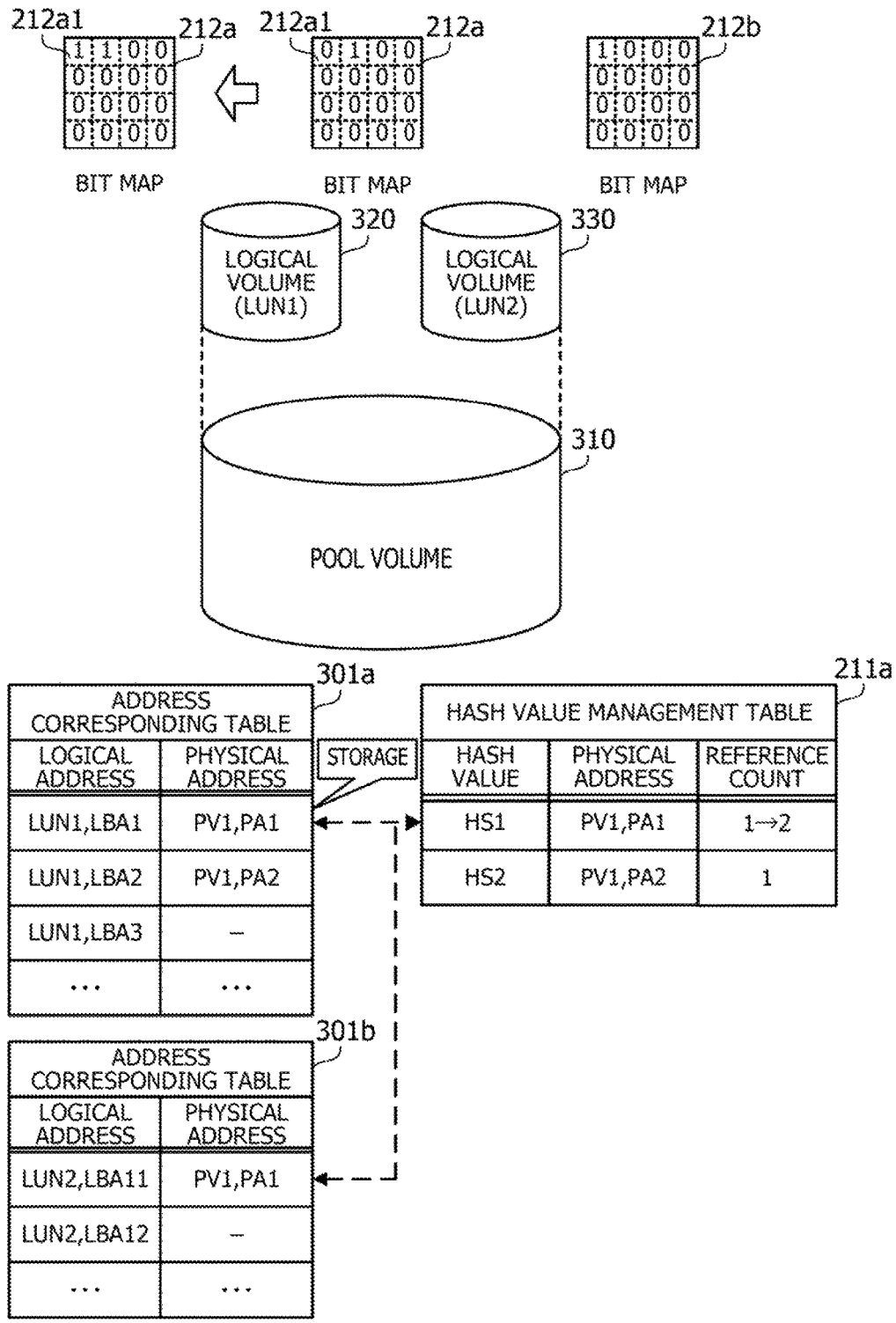
FIG. 8 is a diagram illustrating a specific example of (1 of 2) of the second embodiment.

FIG. 8 is a diagram illustrating a specific example of (1 of 2) of the second embodiment. The difference between FIG. 8 and FIGS. 6 and 7 is that bit maps 212a and 212b are newly created. Thus, a description will be given mainly of the bit maps 212a and 212b.

The bit maps 212a and 212b are stored in the RAM 202. The bit map 212a has bits corresponding to the respective logical blocks of the logical volume 320. The bit map 212b has bits corresponding to the respective logical blocks of the logical volume 330. Each of the bits of the bit maps 212a and 212b manages whether or not data is written in the corresponding logical block. For example, a bit corresponding to a logical block in which the host device 400 has not requested to write data is set to "0". When a write request is made to the logical block, the bit corresponding to the logical block is set to "1".

FIG. 8 illustrates the case where the host device 400 issued a write request of a data block by specifying a logical address (LUN, LBA). The CM 200 receives the logical address (LUN1, LBA1) of a write destination and a data block from the host device 400. The CM 200 determines whether or not the received data block and the data block stored in the pool volume 310 are duplicates using a hash value calculated based on the received data block.

Here, it is assumed that a determination is made that the data blocks are duplicate as in the case of FIG. 6, and the same data block as the received data block is stored in the physical address (PV1, PA1) of the pool volume 310. In this case, the CM 200 does not store the received data block in the pool volume 310 and stores the relationship between the logical address (LUN1, LBA1) and the physical address (PV1, PA1) in the address corresponding table 301a. After the storage by the CM 200, the CM 200 changes the reference count corresponding to the physical address (PV1, PA1) in the hash value management table 211a from 1 to 2.

Further, the CM 200 stores that data is written in the area 212a1 corresponding to the logical address (LUN1, LBA1) of the bit map 212a. Thereby, the bit of the area 212a1 is changed from 0 to 1.

Figure 9:
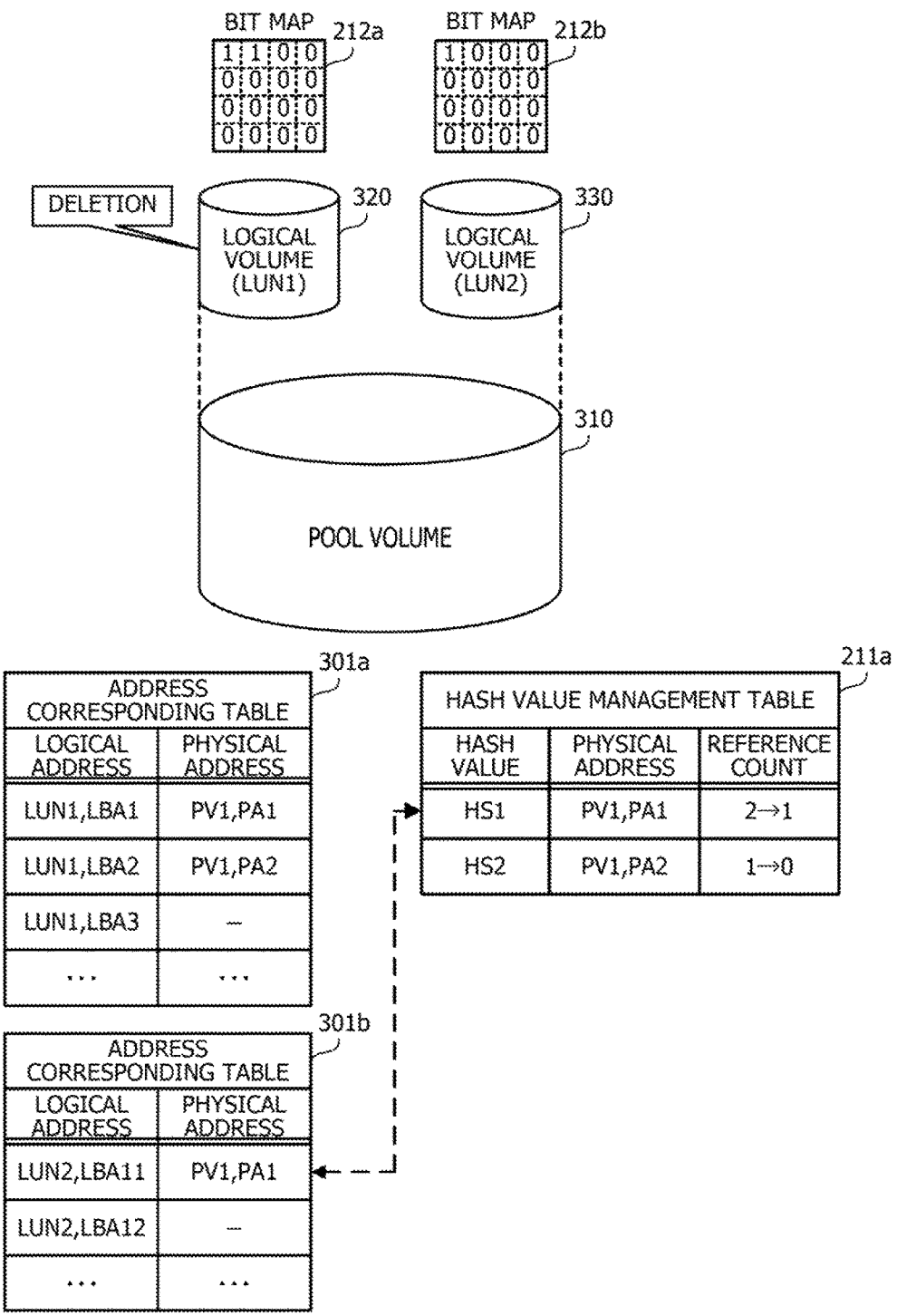
FIG. 9 is a diagram illustrating a specific example of (2 of 2) of the second embodiment.

FIG. 9 is a diagram illustrating a specific example of (2 of 2) of the second embodiment. FIG. 9 illustrates the case where the CM 200 deletes the logical volume 320 by an instruction from the host device 400 from the state in FIG. 8.

The CM 200 receives a deletion instruction of the logical volume 320 from the host device 400, and starts the deletion processing of the logical volume 320. When the CM 200 deletes the logical volume 320, the number of logical blocks that reference the blocks of the pool volume 310 is reduced. Accordingly, the CM 200 subtracts from the reference count value stored in the hash value management table 211a.

The CM 200 refers to the bit map 212a corresponding to the logical volume 320, and identifies the logical address (LUN1, LBA1) whose bit is 1. The CM 200 refers to the record corresponding to the identified logical address (LUN1, LBA1) among the records of the address corresponding table 301a and reads the physical address (PV1, PA1) from the record. The CM 200 refers to the hash value management table 211a and changes the value of the reference count corresponding to the read physical address (PV1, PA1) from 2 to 1.

Also, the CM 200 refers to the bit map 212a, and identifies the logical address (LUN1, LBA2) whose bit is 1. The CM 200 refers to the record corresponding to the identified logical address (LUN1, LBA2) among the records of the address corresponding table 301a, and reads the physical address (PV1, PA2) from the record. The CM 200 refers to the hash value management table 211a and changes the value of the reference count corresponding to the read physical address (PV1, PA2) from 1 to 0.

By the above procedure, the CM 200 identifies the logical block whose bit is 1 based on the bit map 212a in sequence, and reads the physical address corresponding to the identified logical address from the address corresponding table 301a and subtracts from the value of the corresponding reference count. When the CM 200 completes such subtraction processing of the reference count, the CM 200 deletes the address corresponding table 301a, the bit map 212a, and the logical volume 320. Also, the CM 200 refers to the hash value management table 211a, and releases the physical address whose reference count value is 0. In the example in FIG. 9, the block indicated by the physical address (PV1, PA2) is released and is returned to the unassigned block.

In this manner, in the second embodiment, CM 200 searches the address corresponding table 301a only for a logical address having a bit of 1 in the bit map 212a. That is to say, the CM 200 does not search the address corresponding table 301a for a logical address whose bit is "0". For example, the logical address (LUN1, LBA3) is not searched. In this manner, not all the logical addresses stored in the address corresponding table 301a are searched, and only the logical addresses whose bit in the bit map 212a is "1" are searched, and thus the number of access times to the storage device 20 is reduced. As a result, it is possible to reduce the processing time for deleting the logical volume.

Next, a detailed description will be given of the CM 200.

Figure 10:
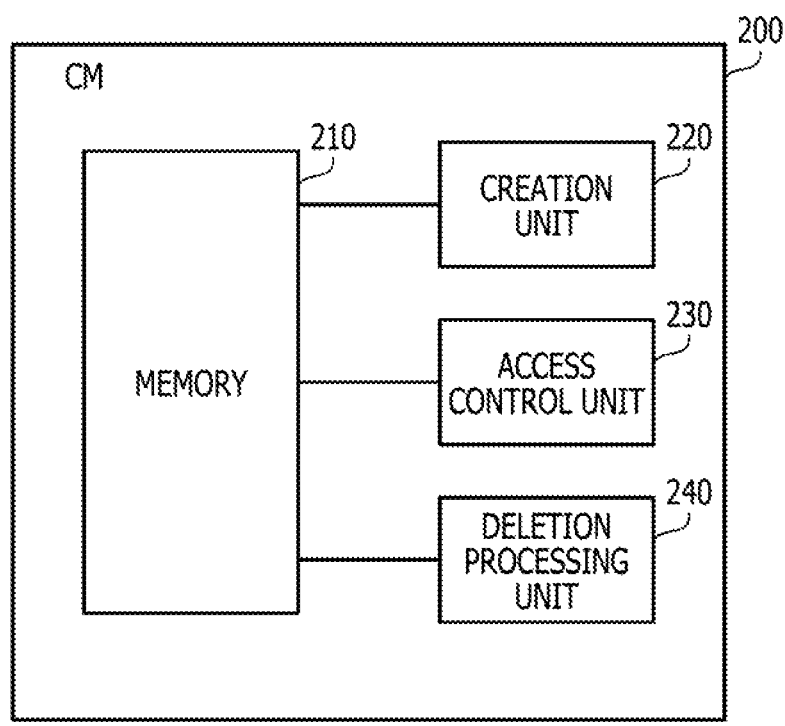
FIG. 10 is a diagram illustrating an example of the functions of the CM.

FIG. 10 is a diagram illustrating a functional example of the CM. The CM 200 includes a memory 210, a creation unit 220, an access control unit 230 and a deletion processing unit 240.

The memory 210 is implemented, for example, as a storage area provided in the RAM 202. The memory 210 stores the hash value management table 211 and the bit maps exemplified in FIGS. 8 and 9. Also, the information indicating the corresponding relationship between the bits of the bit maps and the logical addresses is stored in the memory 210. Further, the management information indicating the empty state of the blocks in each pool volume is also stored in the memory 210. Also, the memory 210 may store part of the information of the address corresponding table 301.

At least part of the processing of the creation unit 220, the access control unit 230 and the deletion processing unit 240 are realized, for example, by the processor 201 executing a predetermined program.

The creation unit 220 creates a logical volume. The creation unit 220 creates the bit map corresponding to the logical volume and the address corresponding table 301 corresponding to the logical volume.

The access control unit 230 receives an access request to the logical volume from the host device 400, and performs access control in accordance with the request. For example, when the access control unit 230 receives a write request and a data block from the host device 400, the access control unit 230 determines whether or not the received data block is already stored in the corresponding pool volume. If the data block is not stored, the access control unit 230 stores the data block in the pool volume. On the other hand, if the data block is stored, the access control unit 230 does not store the data block in the pool volume.

The access control unit 230 sets the bit of the bit map corresponding to the logical address to which a write request is issued to 1. Also, the access control unit 230 stores the relationship between the logical address to which the write request is issued and the physical address in the address corresponding table 301. Further, the access control unit 230 updates the reference count of the hash value management table 211.

Also, when the access control unit 230 receives a read request from the host device 400, the access control unit 230 performs read processing of a data block.

When the deletion processing unit 240 receives a deletion instruction of a logical volume from the host device 400, the deletion processing unit 240 performs the processing accompanied by the deletion of the logical volume with reference to the bit map. More specifically, the deletion processing unit 240 identifies a logical address whose bit in the bit map is "1", and reads a physical address associated with the identified logical address from the address corresponding table 301. The deletion processing unit 240 refers to the hash value management table 211 and subtracts from the reference count corresponding to the read physical address. Also, when the deletion processing unit 240 completes the subtraction processing of all the reference counts, the deletion processing unit 240 deletes the address corresponding table 301 and the bit map that correspond to the logical volume to be deleted. Also, the deletion processing unit 240 deletes the logical volume to be deleted.

Next, a description will be given of the processing executed by the CM 200 using a flowchart.

Figure 11:
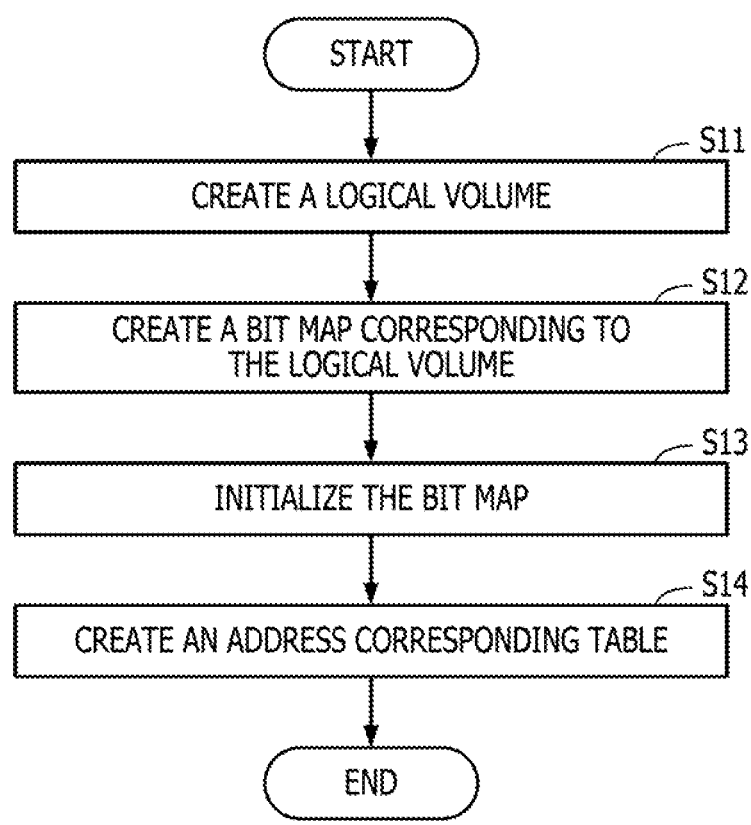
FIG. 11 is a flowchart illustrating an example of processing at the time of creating a logical volume.

FIG. 11 is a flowchart illustrating an example of processing at the time of creating a logical volume. In the following, a description will be given of the processing illustrated in FIG. 11 with reference to the step numbers.

(S11) The creation unit 220 creates a logical volume by an instruction from the host device 400. A pool volume is assigned to the created logical volume.

(S12) The creation unit 220 creates a bit map corresponding to the created logical volume and stores the bit map in the memory 210. Specifically, the creation unit 220 creates the bit map in accordance with the capacity of the created logical volume. For example, the creation unit 220 creates the bit map including the number of bits calculated by "the capacity of the logical volume/the capacity of the logical block (4 kilobytes)".

(S13) The creation unit 220 initializes the created bit map. That is to say, the creation unit 220 sets all the bits of the bit map to 0.

(S14) The creation unit 220 creates an address corresponding table 301 corresponding to the created logical volume. The creation unit 220 creates the records corresponding to all the logical blocks of the created logical volume in the address corresponding table 301, stores information indicating a LUN and an LBA in the items of each record, and leaves the item Physical Address blank. The creation unit 220 stores the created address corresponding table 301 in the storage device of the DE 300. The processing then is terminated.

Figure 12:
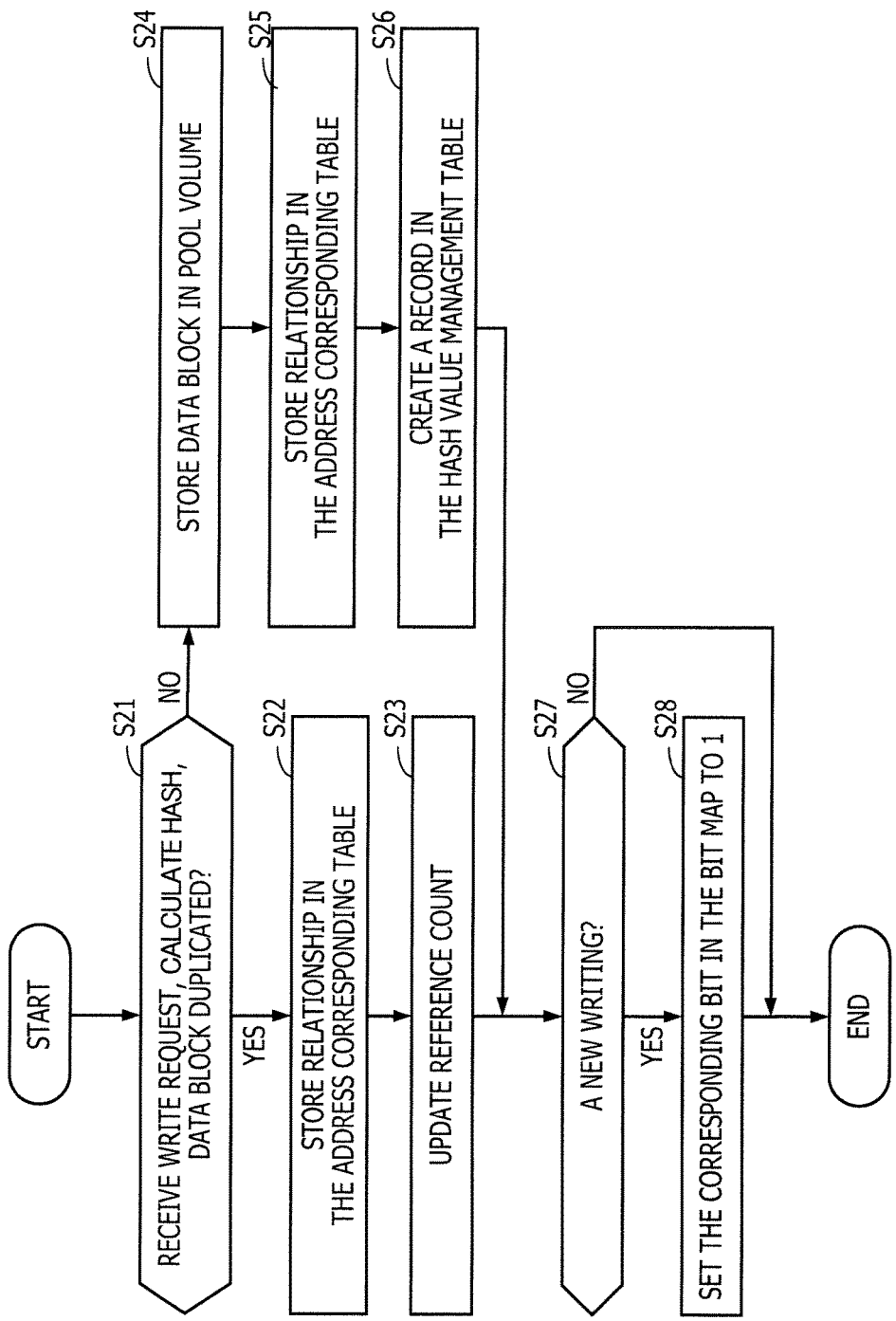
FIG. 12 is a flowchart illustrating an example of write processing.

FIG. 12 is a flowchart illustrating an example of write processing. In the following, a description will be given of the processing illustrated in FIG. 12 along the step numbers. In this regard, the hash value management table 211 referenced in FIG. 12 is the hash value management table 211 corresponding to the pool volume assigned to the logical volume in which data is to be written. Also, the address corresponding table 301 referenced in FIG. 12 is the address corresponding table 301 corresponding to the logical volume in which data is to be written.

(S21) The access control unit 230 receives a write request and a data block from the host device 400. The write request includes information indicating an LUN and an LBA. The access control unit 230 calculates a hash value of the write requested data block using the hash function of SHA-1. The access control unit 230 determines whether or not the received data block and the data block stored in the pool volume 310 are duplicated depending on whether or not the calculated hash value is stored in the hash value management table 211.

If the calculated hash value is not stored in the hash value management table 211 (not duplicated), the processing proceeds to step S24. On the other hand, if the calculated hash value is stored in the hash value management table 211 (duplicated), the processing proceeds to step S22. In this case, the access control unit 230 skips the processing (corresponding to step S24) for storing the received data block in the pool volume 310.

(S22) The access control unit 230 stores the relationship between the physical address in which the data block determined to be duplicated and the logical address at which data is requested to be written, in the address corresponding table 301. In this regard, the stored physical address is the physical address associated with the same hash value with the calculated hash value in the hash value management table 211.

Here, if another physical address has been stored before a physical address is stored in the item Physical Address of the address corresponding table 301, this case is referred to as update.

(S23) The access control unit 230 refers to the hash value management table 211, and adds one to the reference count corresponding to the physical address at which the data block determined to be duplicated is stored.

Also, in the case of update, the access control unit 230 determines the physical address that was stored, before storing in the item Physical Address in step S22, of the address corresponding table 301. The access control unit 230 subtracts one from the reference count associated with the determined physical address in the hash value management table 211. The processing then proceeds to step S27.

In this regard, if the reference count after the subtraction becomes 0, the access control unit 230 releases the block in the pool volume 310 indicated by the physical address associated with the reference count. For example, the access control unit 230 stores the physical block in the management information in which empty areas in the pool volume 310 are managed as an unassigned block. Also, the access control unit 230 deletes the record including the subtracted reference count from the hash value management table 211.

(S24) The access control unit 230 selects an unassigned physical address from the corresponding pool volume 310. The access control unit 230 stores the received data block in the block indicated by the physical address selected from the pool volume 310.

(S25) The access control unit 230 stores the relationship between the physical address to which the data block is written and the logical address to which the write request is issued in the address corresponding table 301.

Here, if another physical address has been stored in the item of the physical address before the physical address is stored in the item of the address corresponding table 301, that case is referred to as update.

(S26) The access control unit 230 creates a record in (adds a new record to) the hash value management table 211. The access control unit 230 stores the physical address at which the data block is stored in the item Physical Address of the added record. The access control unit 230 stores the hash value calculated in step S21 in the item Hash Value of the added record. The access control unit 230 stores 1 in the item Reference Count of the added record.

Also, in the case of update, the access control unit 230 determines the physical address having been stored in the item Physical Address before storing the physical address in the address corresponding table 301 in step S25. The access control unit 230 subtracts 1 from the reference count associated with the determined physical address in the hash value management table 211.

In this regard, if the reference count after the subtraction becomes 0, the access control unit 230 releases the corresponding block in the pool volume 310 in the same procedure described in step S22, and deletes the corresponding record in the hash value management table 211.

(S27) The access control unit 230 determines whether or not new writing is performed. New writing refers to the case where a physical address has not been stored in the item of the physical address in the record in which writing is to be performed in step S22 or step S25 in the address corresponding table 301. In this regard, in this case, a determination may be made not by the fact that a physical address is stored in the record, but by the fact that the bit corresponding to the record in the bit map is 0. In the case of new writing, the processing proceeds to step S28. In the case of not new writing, the processing is terminated.

(S28) The access control unit 230 sets the bit corresponding to the logical address (LUN and LBA) at which writing is requested in the bit map to 1. The processing then is terminated.

Figure 13:
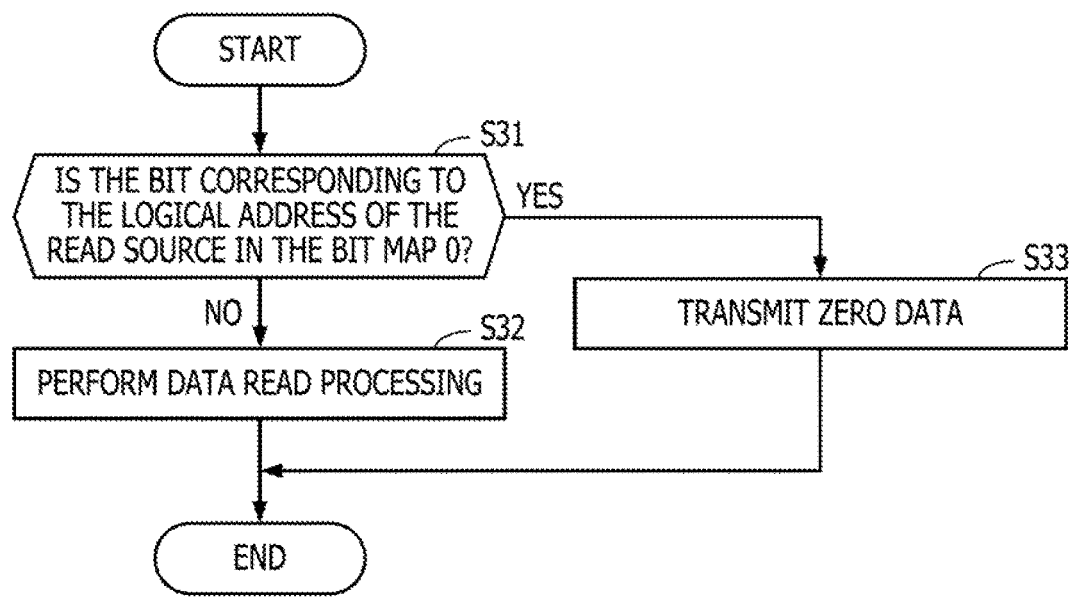
FIG. 13 is a flowchart illustrating an example of read processing.

FIG. 13 is a flowchart illustrating an example of read processing. In the following, a description will be given of the processing illustrated in FIG. 13 along the step numbers.

(S31) The access control unit 230 receives a read request from the host device 400. The read request includes a LUN and an LBA indicating the logical address of a reading source. The access control unit 230 determines whether or not the bit corresponding to the logical address (LUN and LBA) of the reading source in the bit map is 0. If the bit is 0, the processing proceeds to step S33. If the bit is 1, the processing proceeds to step S32.

(S32) The access control unit 230 performs read processing of the data block. More specifically, the access control unit 230 refers to the address corresponding table 301 and identifies a physical address corresponding to the logical address of the reading source. The access control unit 230 reads the data block stored in the block of the pool volume 310, which is indicated by the identified physical address. The access control unit 230 transmits the read data block to the host device 400. The processing then is terminated.

(S33) The access control unit 230 transmits zero data to the host device 400. In this regard, zero data is data that indicates nonexistence of data, and is for example, a sequence of bit value 0. The processing then is terminated.

In this manner, if the bit corresponding to the logical address of the reading source in the bit map is 0, the access control unit 230 does not access the storage device in the DE 300. That is to say, the access control unit 230 does not have to refer to the address corresponding table 301 stored in the storage device in the DE 300 in order to confirm that read requested data does not exist in the storage device of the DE 300. Accordingly, it is possible to increase the response speed to a read request using the bit map.

Figure 14:
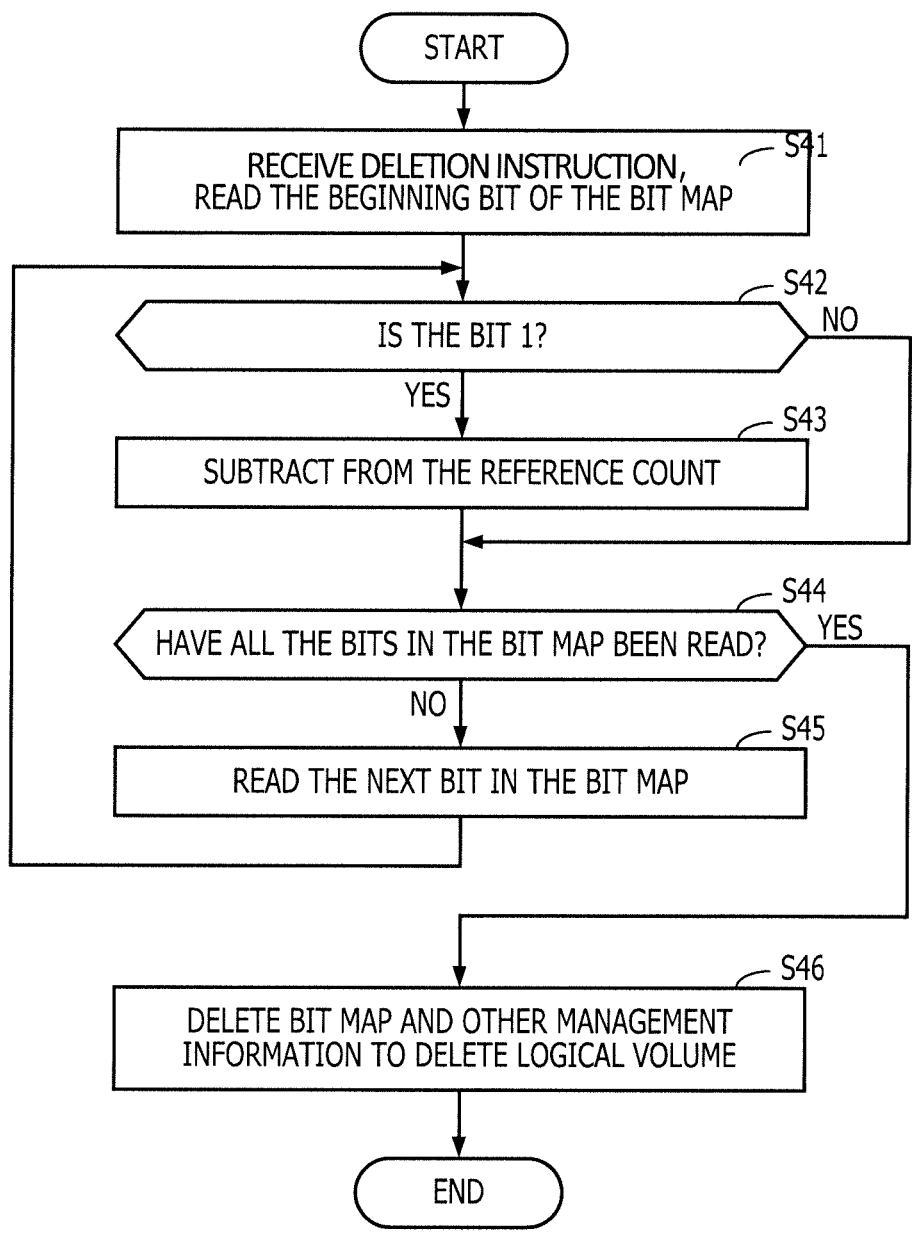
FIG. 14 is a flowchart illustrating an example of deletion processing of a logical volume.

FIG. 14 is a flowchart illustrating an example of deletion processing of a logical volume. In the following, a description will be given of the processing illustrated in FIG. 14 along the step numbers.

(S41) The deletion processing unit 240 receives a deletion instruction of a logical volume from the host device 400. A deletion instruction includes an LUN indicating the logical volume to be deleted. The deletion processing unit 240 reads the beginning bit of the bit map, which corresponds to the logical volume to be deleted.

(S42) The deletion processing unit 240 determines whether or not the bit is 1. If the bit is 1, the processing proceeds to step S43. If the bit is 0, the processing proceeds to step S44.

(S43) The deletion processing unit 240 refers to the address corresponding table 301, and identifies the physical address associated with the logical address that is managed by the bit determined in step S42. The deletion processing unit 240 refers to the hash value management table 211 and subtracts from the reference count corresponding to the identified physical address.

Here, if the reference count becomes 0 after the subtraction, the deletion processing unit 240 releases the block of the pool volume 310, which is indicated by the physical address associated with the reference count. Also, the deletion processing unit 240 deletes the record including the subtracted reference count from the hash value management table 211.

(S44) The deletion processing unit 240 determines whether or not all the bits in the bit map have been read. If all the bits have not been read, the processing proceeds to step S45. If all the bits have been read, the processing proceeds to step S46.

(S45) The deletion processing unit 240 reads the next bit in the bit map. The processing then proceeds to step S42.

(S46) The deletion processing unit 240 deletes the bit map corresponding to the logical volume to be deleted and the address corresponding table 301. Also, the deletion processing unit 240 deletes the other management information regarding the logical volume to be deleted so as to delete this logical volume. The processing then is terminated.

Also, it is possible to realize the information processing according to the first embodiment by causing the processor used for the storage controller 10 to execute the program. It is possible to realize the information processing according to the second embodiment by causing the processor 201 to execute the program. It is possible to record the program in a computer-readable recording medium.

For example, it is possible to circulate the program by distributing a recording medium on which the program is recorded. Also, the program that realizes the functions corresponding to the creation unit 220, the access control unit 230, and the deletion processing unit 240 may be divided into separate programs, and the individual programs may be distributed separately. The functions of the creation unit 220, the access control unit 230, and the deletion processing unit 240 may be realized by separate computers respectively. The computer, for example, may store (install) the program recorded on a recording medium in the RAM 202 or the SSD 203, and may read the program from the storage device, and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage controller comprising:
a memory configured to store first management information indicating data writing to each of a plurality of logical blocks corresponding to a plurality of physical blocks of a storage device; and
a processor coupled to the memory and configured to:
receive a write request of write data to a first logical block among the plurality of logical blocks,
assign a first physical block among the plurality of physical blocks to the first logical block,
write the write data in the first physical block,
record in the first management information that data has been written in the first logical block,
identify a second logical block in which data has been written among the plurality of logical blocks based on the first management information,
write addresses of the plurality of physical blocks assigned to the corresponding plurality of logical blocks in the storage device as second management information,
read an address of a second physical block assigned to the second logical block from the second management information, and
release the second physical block.

2. The storage controller according to claim 1,
wherein the memory further stores third management information indicating the number of assignments to each of the plurality of logical blocks for each of the plurality of physical blocks, and
when writing the write data to the first logical block is requested, the processor assigns the first logical block to the first physical block so as to remove duplicate data stored in the storage device, and from the number of assignments stored in the third management information, the processor subtracts the number of assignments corresponding to the second physical block indicated by the address read from the second management information, and if the number of assignments after the subtraction is 0, the processor releases the second physical block.

3. The storage controller according to claim 1, wherein the storage device includes a plurality of logical volumes corresponding to a storage area, the memory further stores the first management information corresponding to each of the plurality of logical volumes, and third management information indicating the number of assignments to each of the plurality of logical blocks in the plurality of logical volumes for each of the plurality of physical blocks, and the processor writes the second management information corresponding to each of the plurality of logical volumes in the storage device, and when writing the write data to the first logical block included in the plurality of logical volumes is requested, the processor assigns the first physical block to the first logical block so as to remove duplicate data in the storage area, and from the number of assignments stored in the third management information, the processor subtracts the number of assignments corresponding to the second physical block indicated by the address read from the second management information, and if the number of assignments after the subtraction is 0, the processor releases the second physical block.

4. The storage controller according to claim 1, wherein when the processor receives a read request from a third logical block among the plurality of logical blocks from an external device, the processor determines whether or not data is written in the third logical block based on the first management information, and if data is not written in the third logical block, the processor transmits information indicating that data is not written to the external device.

5. A storage system comprising:

a storage device configured to store second management information including a plurality of addresses of physical blocks, each of the plurality of addresses corresponding to a plurality of logical blocks, respectively;

a memory configured to store first management information indicating data writing to each of the plurality of logical blocks corresponding to a plurality of physical blocks of the storage device; and a processor coupled to the memory and configured to:

receive a write request of write data to a first logical block among the plurality of logical blocks, assign a first physical block among the plurality of physical blocks to the first logical block, write the write data in the first physical block, record in the first management information that data has been written in the first logical block, identify a second logical block in which data has been written among the plurality of logical blocks based on the first management information, write addresses of the plurality of physical blocks assigned to the corresponding plurality of logical blocks in the storage device as the second management information, read an address of a second physical block assigned to the second logical block from the second management information, and release the second physical block.

6. A storage control method comprising:

receiving, by a processor, a write request of write data to a first logical block among a plurality of logical blocks, the plurality of logical blocks corresponding to a plurality of physical blocks of a storage device;

assigning, by a processor, a first physical block among the plurality of physical blocks to the first logical block;

writing, by a processor, the write data in the first physical block;

recording, by a processor, in first management information stored in a memory that data has been written in the first logical block, the first management information indicating data writing to each of the plurality of logical blocks;

identifying, by a processor, a second logical block in which data has been written among the plurality of logical blocks based on the first management information;

writing, by a processor, addresses of the plurality of physical blocks assigned to the corresponding plurality of logical blocks in the storage device as second management information;

reading, by a processor, an address of a second physical block assigned to the second logical block from the second management information; and releasing, by a processor, the second physical block.

* * * * *